(12) United States Patent
He et al.

(10) Patent No.: US 12,676,368 B2
(45) Date of Patent: Jul. 7, 2026

(54) CELL, BATTERY PACK, AND ELECTRIC VEHICLE

(71) Applicant: BYD COMPANY LIMITED, Shenzhen (CN)

(72) Inventors: Long He, Shenzhen (CN); Huajun Sun, Shenzhen (CN); Yan Zhu, Shenzhen (CN); Shichao Hu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 647 days.

(21) Appl. No.: 17/792,305

(22) PCT Filed: Dec. 29, 2020

(86) PCT No.: PCT/CN2020/140820
§ 371 (c)(1),
(2) Date: Jul. 12, 2022

(87) PCT Pub. No.: WO2021/143514
PCT Pub. Date: Jul. 22, 2021

(65) Prior Publication Data
US 2023/0054089 A1     Feb. 23, 2023

(30) Foreign Application Priority Data
Jan. 13, 2020     (CN) .......................... 202010032935.3

(51) Int. Cl.
*H01M 50/186*     (2021.01)
*H01M 50/358*     (2021.01)
(Continued)

(52) U.S. Cl.
CPC ....... *H01M 50/186* (2021.01); *H01M 50/358* (2021.01); *H01M 50/446* (2021.01);
(Continued)

(58) Field of Classification Search
None
See application file for complete search history.

(56) References Cited

U.S. PATENT DOCUMENTS

| 2014/0342204 A1* | 11/2014 | Hatta | ................... | H01M 50/141 |
| | | | | 429/94 |
| 2021/0175572 A1* | 6/2021 | He | ....................... | H01M 50/317 |

FOREIGN PATENT DOCUMENTS

| CN | 2727978 Y | | 9/2005 |
| CN | 201655905 U | * | 11/2010 |

(Continued)

OTHER PUBLICATIONS

CN 110518174A Machine Translation (Year: 2019).*

(Continued)

*Primary Examiner* — Mark Ruthkosky
*Assistant Examiner* — Sarah J Jacobson
(74) *Attorney, Agent, or Firm* — Sheppard Mullin Richter & Hampton LLP

(57) ABSTRACT

A cell, a battery pack, and an electric vehicle are provided. The cell includes a metal housing, and multiple hermetical accommodating cavities, multiple electrode core assemblies, and an encapsulation film arranged in the metal housing. The electrode core assemblies are arranged along a first direction and connected in series. A length of each electrode core assembly extends along the first direction. The electrode core assembly includes an electrode core assembly body, and a first electrode and a second electrode configured to lead out a current and be respectively arranged on two sides of the electrode core assembly body along the first direction. The accommodating cavities are defined by the encapsulation film, and the electrode core assembly body is arranged in the accommodating cavity. A length of the cell extends (Continued)

along the first direction. A thickness of the cell extends along a second direction perpendicular to the first direction.

28 Claims, 6 Drawing Sheets

(51) Int. Cl.
| | |
|---|---|
| *H01M 50/446* | (2021.01) |
| *H01M 50/46* | (2021.01) |
| *H01M 50/489* | (2021.01) |
| *H01M 50/531* | (2021.01) |

(52) U.S. Cl.
CPC ......... *H01M 50/46* (2021.01); *H01M 50/489* (2021.01); *H01M 50/531* (2021.01); *H01M 2220/20* (2013.01)

(56) References Cited

FOREIGN PATENT DOCUMENTS

| | | | |
|---|---|---|---|
| CN | 103824985 | A | 5/2014 |
| CN | 104412409 | A | 3/2015 |
| CN | 206401380 | U | 8/2017 |
| CN | 107644961 | A | 1/2018 |
| CN | 207781826 | U | 8/2018 |
| CN | 108615828 | A | 10/2018 |
| CN | 108780856 | A * | 11/2018 ........ H01M 10/0468 |
| CN | 109378412 | A | 2/2019 |
| CN | 110518156 | A | 11/2019 |
| CN | 110518174 | A | 11/2019 |
| CN | 110828717 | A | 2/2020 |
| CN | 110828744 | A | 2/2020 |
| CN | 110828745 | A | 2/2020 |
| CN | 110828746 | A | 2/2020 |
| EP | 4057440 | A1 | 9/2022 |
| JP | 2001256965 | A | 9/2001 |
| JP | 2001307704 | A | 11/2001 |
| JP | 2003-086240 | A | 3/2003 |
| JP | 2004-241328 | A | 8/2004 |
| JP | 2005-026152 | A | 1/2005 |
| JP | 2012-128984 | A | 7/2012 |
| JP | 2012146588 | A | 8/2012 |
| JP | 2013-118152 | A | 6/2013 |
| JP | 2016-066519 | A | 4/2016 |
| WO | 2019/087956 | A1 | 5/2019 |

OTHER PUBLICATIONS

CN 108780856 A Machine Translation (Year: 2018).*
CN 201655905 U Machine Translation (Year: 2010).*
International Search Report and Written Opinion for Application No. PCT/CN2020/140820, mailed on Mar. 29, 2021, 13 pages.
Notice of Reasons for Refusal dated Jul. 22, 2025, issued in Japanese Patent Application No. 2022-542691, with English machine translation (27 pages).

* cited by examiner

CELL, BATTERY PACK, AND ELECTRIC VEHICLE

CROSS-REFERENCE TO RELATED APPLICATIONS

This application is a national phase application of International Patent Application No. PCT/CN2020/140820, filed with the China National Intellectual Property Administration (CNIPA) on Dec. 29, 2020, which is based on and claims priority to and benefits of Chinese Patent Application No. 202010032935.3, filed on Jan. 13, 2020. The entire content of all of the above-identified applications is incorporated herein by reference.

FIELD

The present disclosure belongs to the field of cells, and more specifically, to a cell, a battery pack, and an electric vehicle.

BACKGROUND

Battery packs applied to electric vehicles generally include multiple cells to increase battery capacity. The multiple cells are mounted in a case of the battery pack.

Electrolyte solution is required to be added to the cells during manufacturing, and therefore the cells are required to be sealed to prevent leakage of the electrolyte solution. In related arts, an electrode core is generally directly sealed in a housing, and then the electrolyte solution is injected through an injection port on the housing. Upon completion of injection of the electrolyte solution, the injection port is sealed to obtain the cell. However, in the above method, since the electrode core and the electrolyte solution are directly sealed in the housing of the cell, once the housing is damaged, the electrolyte solution is prone to leakage, and the sealing effect is relatively poor.

In addition, when the existing cell includes multiple electrode cores, the multiple electrode cores are usually arranged in parallel (that is, a row array). However, this arrangement is not conducive to the series connection of multiple electrode cores. Positive and negative terminals between the electrode cores need to be connected by relatively long wires.

SUMMARY

The present disclosure resolves at least one of technical problems existing in related arts. A first aspect of the present disclosure provides a cell, including a hermetical metal housing and at least two hermetical accommodating cavities, multiple electrode core assemblies, and an encapsulation film arranged in the metal housing. A direction in which the electrode core assemblies are arranged is a first direction. The electrode core assemblies are connected in series. A length of each electrode core assembly extends along the first direction. The electrode core assembly includes an electrode core assembly body and a first electrode and a second electrode configured to lead out a current. The first electrode and the second electrode are respectively arranged on two sides of the electrode core assembly body along the first direction. At least one of the accommodating cavities is defined by the encapsulation film, and the electrode core assembly body is arranged in the accommodating cavity. A length of the cell extends along the first direction, and the length of the cell ranges from 400 mm to 2500 mm. A thickness of the cell extends along a second direction perpendicular to the first direction. A ratio of the length to the thickness of the cell ranges from 5 to 250.

In some implementations of the present disclosure, for two adjacent electrode core assemblies connected in series, the first electrode of one electrode core assembly is electrically connected with the second electrode of the other electrode core assembly to realize series connection.

In some implementations of the present disclosure, one encapsulation film is arranged, and the multiple electrode core assemblies connected in series are sealed in the one encapsulation film.

For two electrode core assemblies connected in series, a position where the first electrode of one electrode core assembly and the second electrode of the other electrode core assembly are connected is located in the encapsulation film.

In some implementations of the present disclosure, an encapsulation portion is formed at a position on the encapsulation film corresponding to the first electrode and/or the second electrode, to separate the encapsulation film into the multiple accommodating cavities.

At least one of the first electrode of one of the two adjacent electrode core assemblies and the second electrode of the other of the two adjacent electrode core assemblies is arranged in the encapsulation portion.

In some implementations of the present disclosure, multiple encapsulation films are arranged. Each of the encapsulation films defines one independent accommodating cavity. At least one of the electrode core assemblies is sealed in one of the encapsulation films. The first electrode and/or the second electrode of the at least one electrode core assembly extends out of the encapsulation film.

In some implementations of the present disclosure, an air pressure between the metal housing and the encapsulation film is lower than an air pressure outside the metal housing.

In some implementations of the present disclosure, the air pressure between the metal housing and the encapsulation film is $P1$, and $P1$ ranges from $-100$ Kpa to $-5$ Kpa.

In some implementations of the present disclosure, the air pressure $P1$ between the metal housing and the encapsulation film ranges from $-75$ Kpa to $-20$ Kpa.

In some implementations of the present disclosure, the air pressure $P1$ between the metal housing and the encapsulation film and an air pressure $P2$ inside the encapsulation film satisfy: $P1>P2$, and a ratio between $P1$ and $P2$ ranges from 0.05 to 0.85.

In some implementations of the present disclosure, a value of $P2$ ranges from $-100$ Kpa to $-20$ Kpa.

In some implementations of the present disclosure, the metal housing has two opposite first surfaces along the second direction, the second direction is a thickness direction of the cell, and at least one of the first surfaces is recessed into the metal housing.

In some implementations of the present disclosure, the two first surfaces are both recessed into the metal housing to hold the electrode core assemblies.

In some implementations of the present disclosure, multiple recesses are arranged, and one of the recesses is arranged corresponding to one of the electrode core assemblies.

In some implementations of the present disclosure, the encapsulation film includes a non-metallic outer film layer and a non-metallic inner film layer that are stacked. The inner film layer is arranged between the electrode core assembly and the outer film layer. A melting point of the outer film layer is greater than a melting point of the inner film layer. A difference between the melting point of the outer film layer and the melting point of the inner film layer is between 30° C. and 80° C.

In some implementations of the present disclosure, a material of the outer film layer is one or a combination of more than one of polyethylene terephthalate, polyamide, or polypropylene. A material of the inner film layer is one or a combination of more than one of polypropylene, polyethylene, or polyethylene terephthalate.

In some implementations of the present disclosure, the outer film layer and the inner film layer are bonded.

In some implementations of the present disclosure, a binder for the bonding is a polyolefin binder.

In some implementations of the present disclosure, the encapsulation film is an aluminum-plastic film.

In some implementations of the present disclosure, the cell is substantially a cuboid, and the thickness of the cell is larger than 10 mm.

In some implementations of the present disclosure, the thickness of the cell ranges from 13 mm to 75 mm.

In some implementations of the present disclosure, the metal housing includes a housing body with an opening and an end cover. The end cover is hermetically connected with the opening of the housing body. The electrode core assemblies are connected in series to form an electrode core string. Two ends of the electrode core string respectively include a first electrode and a second electrode, and the first electrode and the second electrode are respectively led out through the end cover.

In some implementations of the present disclosure, an exhaust hole is provided on the metal housing, and a sealing member is arranged in the exhaust hole.

In some implementations of the present disclosure, a thickness of the metal housing ranges from 0.05 mm to 1 mm.

A second aspect of the present disclosure provides a battery pack, including a cell array. The cell array includes multiple cells. Each cell includes a hermetical metal housing and at least two hermetical accommodating cavities, multiple electrode core assemblies, and an encapsulation film arranged in the metal housing. The electrode core assemblies are arranged along a first direction. The electrode core assemblies are connected in series. A length of each electrode core assembly extends along the first direction. The electrode core assembly includes an electrode core assembly body and a first electrode and a second electrode configured to lead out a current. The first electrode and the second electrode are respectively arranged on two sides of the electrode core assembly body along the first direction. At least one of the accommodating cavities is defined by the encapsulation film, and the electrode core assembly body is arranged in the accommodating cavity. A length of the cell extends along the first direction, and the length of the cell ranges from 400 mm to 2500 mm. A thickness of the cell extends along a second direction perpendicular to the first direction. A ratio of the length to the thickness of the cell ranges from 5 to 250.

In some implementations of the present disclosure, a thickness of the cell extends along a second direction, and the multiple cells are arranged in sequence along the second direction to form the cell array. A gap is provided between at least two adjacent cells, and a ratio of the gap to the thickness of the cell ranges from 0.001 to 0.15.

In some implementations of the present disclosure, the metal housing includes a housing body with an opening and an end cover. The end cover is hermetically connected with the opening of the housing body. The gap between the two adjacent cells includes a first gap d1. The first gap is a minimum distance between two end covers of the two adjacent cells along the second direction. The thickness of the cell is a dimension of the end cover along the second direction, and a ratio of the first gap d1 to the thickness of the cell ranges from 0.005 to 0.1.

In some implementations of the present disclosure, the metal housing has two opposite first surfaces along the second direction. The gap between the two adjacent cells includes a second gap d2. The second gap is a minimum distance between the two first surfaces of the two adjacent cells facing each other. The thickness of the cell is the dimension of the end cover along the second direction.

In some implementations of the present disclosure, the second gap d2 of the cell before use is larger than the second gap d2 after use.

In some implementations of the present disclosure, the battery pack further includes a battery pack cover and a tray. The battery pack cover is hermetically connected with the tray to form a cell accommodating cavity. The cell array is arranged in the cell accommodating cavity. The tray includes a support member. A support region is formed on the metal housing. The cell is butted with the support member by the support region and is supported on the support member.

In some implementations of the present disclosure, the tray includes a side beam. The side beam is a support member, and two ends of the cell along the first direction are supported on the side beam.

A third aspect of the present disclosure provides an electric vehicle, including the battery pack according to any of the above.

Compared with related arts, the present disclosure has the following beneficial effects. In the cell of the present disclosure, the electrode core assemblies are sealed in the encapsulation film, and the electrode core assemblies sealed in the encapsulation film are sealed in the metal housing to perform a double sealing. Therefore, a double-layer sealing effect of the encapsulation film and the metal housing may effectively improve the sealing effect. In addition, multiple electrode core assemblies are arranged in sequence along the length direction of the cell, and the length direction of the electrode core assemblies is the same as the length direction of the cell. The first electrodes and the second electrodes of the electrode core assemblies are respectively arranged on both sides of the electrode core assemblies along the length direction of the electrode core assemblies, so that the electrode core assemblies are arranged in a "head-to-head" manner. This arrangement can more conveniently realize series connection in pairs between the electrode core assemblies.

Additional aspects and advantages of the present disclosure are partially provided in the following description, and partially become apparent in the following description or understood through the practice of the present disclosure.

REFERENCE NUMERALS

Figure 1:
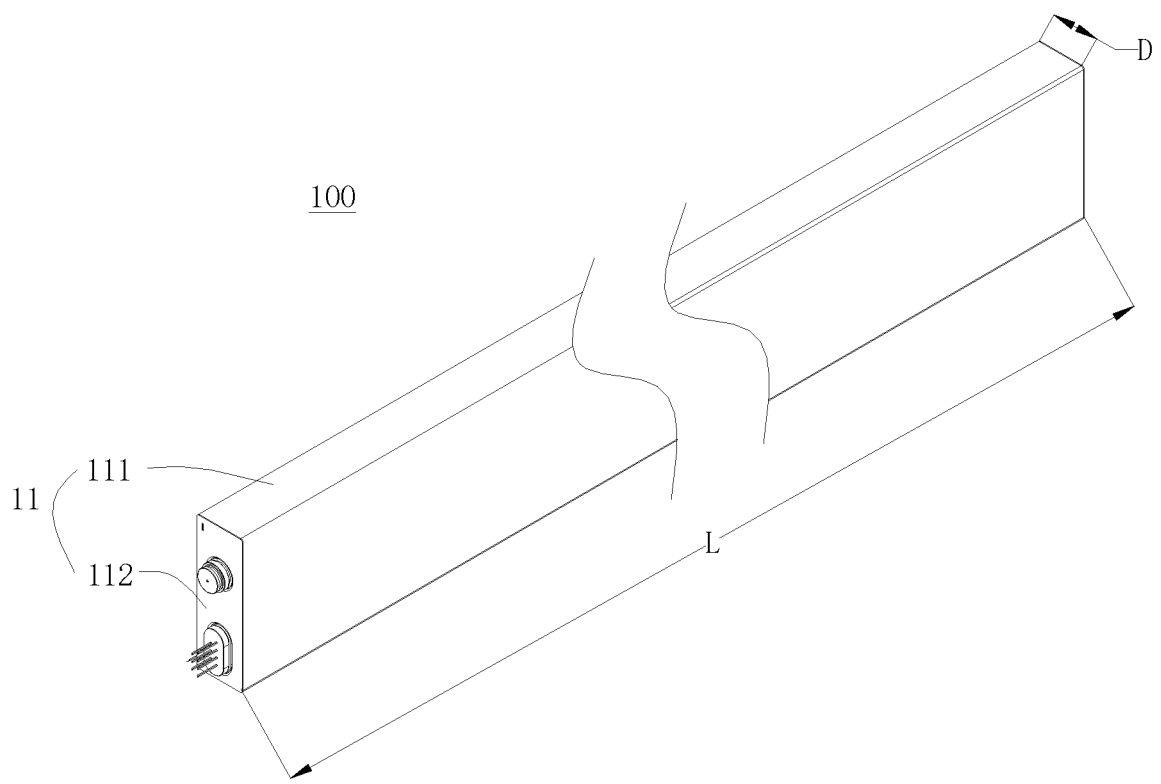
FIG. 1 is a three-dimensional schematic structural diagram of a cell according to an embodiment of the present disclosure.
Figure 2:
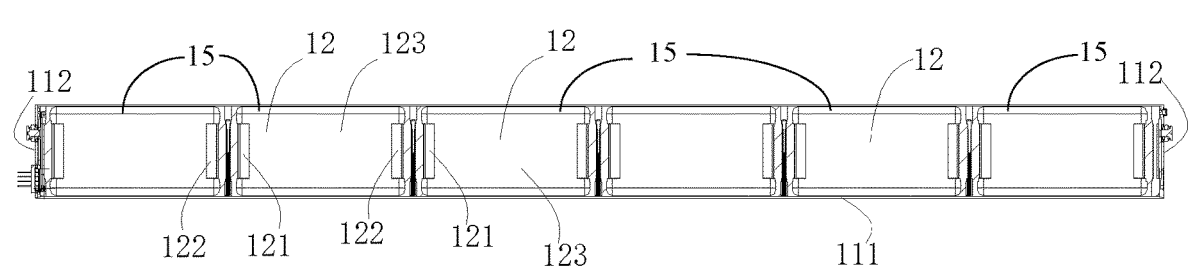
FIG. 2 is a schematic of a cross-sectional view of a cell according to an embodiment of the present disclosure.

100: Cell;
11: Metal housing; 12: Electrode core assembly; 13: Encapsulation film;
111: Housing body; 112: End cover; 113: First surface; 114: Recess;
121: First electrode; 122: Second electrode;
131: Encapsulation portion;
200: Battery pack;
21: Cell array; 22: Tray; 221: Support member;
L: Length of cell;
D: Thickness of cell;
A: First direction; B: Second direction; and
1000: Electric vehicle.

DETAILED DESCRIPTION

Embodiments of the present disclosure are described in detail below, and examples of the embodiments are shown in the accompanying drawings, where the same or similar elements or the elements having the same or similar functions are denoted by the same or similar reference numerals throughout the description. The embodiments described below with reference to the accompanying drawings are exemplary and used only for explaining the present disclosure, and should not be construed as a limitation on the present disclosure.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "axial direction", "radial direction", and "circumferential direction" are based on orientation or position relationships shown in the accompanying drawings, and are used only for ease and brevity of illustration and description of the present disclosure, rather than indicating or implying that the mentioned apparatus or component needs to have a particular orientation or needs to be constructed and operated in a particular orientation. Therefore, such terms should not be construed as limiting of the present disclosure.

As shown in FIG. 1 to FIG. 5, the present disclosure provides a cell 100. The cell 100 is, for example, a cell configured to form a battery pack. The cell 100 includes a hermetical metal housing 11, and at least two hermetical accommodating cavities, multiple electrode core assemblies 12, and an encapsulation film 13 arranged in the metal housing 11.

The electrode core assemblies 12 are connected in series, and each electrode core assembly 12 includes at least one electrode core.

The electrode core assembly 12 includes a first electrode 121 and a second electrode 122 configured to lead out a current. Further, the electrode core assembly 12 includes an electrode core assembly body 123 and the first electrode 121 and the second electrode 122 configured to lead out a current. For two adjacent electrode core assemblies 12 connected in series, the first electrode 121 of one electrode core assembly 12 is connected with the second electrode 122 of the other electrode core assembly 12 to realize series connection. The multiple electrode core assemblies 12 are connected in series, so that the capacity and voltage of a single cell can be increased, and the manufacturing process and costs can be reduced.

At least one of the accommodating cavities is defined by the encapsulation film 13, and the electrode core assembly body 123 is arranged in the accommodating cavity 15.

In other words, a cavity wall of the accommodating cavity is formed by the encapsulation film 13, and each electrode core assembly 123 is respectively arranged in the accommodating cavity, so as to avoid interference between two adjacent electrode core assemblies 12.

It should be noted that, the series connection in this embodiment may be a series connection between adjacent electrode core assemblies 12. A specific implementation may be that the first electrodes 121 and the second electrodes 122 on the adjacent electrode core assemblies are directly connected, or the electrical connection may be realized by an additional conductive component. In a case that the electrode core assembly 12 includes only one electrode core, the first electrode 121 and the second electrode 122 may be respectively a positive tab and a negative tab of the electrode core, or respectively the negative tab and the positive tab of the electrode core. In a case that the electrode core assembly includes multiple electrode cores, lead-out members of the first electrode 121 and the second electrode 122 may be electrode leads. In an embodiment, one of the first electrode 121 and the second electrode 122 is the lead-out member formed by combining and welding together the positive tabs of the multiple electrode cores, and the other of the first electrode and the second electrode is the lead-out member formed by combining and welding together the negative tabs of the multiple electrode cores. "First" and "second" in the first electrode 121 and the second electrode 122 are only used for distinguishing between names, and are not used for limiting the number. For example, one or more first electrodes 121 may be arranged.

A direction in which the multiple electrode core assemblies 12 are arranged is a first direction A, a length direction of each electrode core assembly 12 extends along the first direction A, and a length of the cell also extends along the first direction A. That is, the multiple electrode core assemblies 12 are arranged in sequence along the length direction of the cell, and the first electrode 121 and the second electrode 122 of the electrode core assemblies 12 are respectively arranged on both sides of the electrode core assemblies 12 along the first direction A. That is to say, the multiple electrode core assemblies 12 are arranged in a "head-to-head" manner. This arrangement can easily realize a series connection in pairs between the electrode core assemblies 12, and a connection structure is simple. In addition, this arrangement may facilitate manufacturing of the cell 100 with a longer length. Thus, when the cell 100 is mounted in a case of the battery pack, support structures such as cross bars and longitudinal bars are not required to be arranged, and the cell 100 is directly mounted to the case of the battery pack by using the metal housing 11 of the cell 100 as a support, thereby saving an internal space of the battery pack, increasing the volume utilization of the battery pack, and reducing a weight of the battery pack.

The cell is substantially a cuboid, and a length L of the cell ranges from 400 mm to 2500 mm (millimeter), for example, may be 500 mm, 1000 mm, or 1500 mm. Multiple electrode core assemblies 12 are arranged in the cell. Compared with the existing method of arranging only one electrode core, it is more convenient to manufacture a cell with a longer length. In a conventional cell, once the cell is relatively long, a length of the copper aluminum foil configured as a current collector inside the cell is increased accordingly, an internal resistance of the cell is greatly increased, and the requirements for higher power and quicker charging cannot be satisfied. In a case that the cells have a same length, the embodiment of the present disclosure may greatly reduce the internal resistance of the cell, and avoid a problem caused by overheating of the cell in the case of high power output, quick charge, and the like.

A thickness D of the cell 100 may be larger than 10 mm, for example, may range from 13 mm to 75 mm. The thickness D of the cell 100 extends along a second direction B perpendicular to the first direction A. A ratio of the length L to the thickness D of the cell 100 ranges from 5 to 250.

In the embodiment of the present disclosure, the electrode core assembly 12 is sealed in the encapsulation film 13, that is to say, the encapsulation film 13 is further arranged between the metal housing 11 and the electrode core assembly 12. In this way, a double encapsulation of the electrode core assembly 12 may be achieved by using the encapsulation film 13 and the metal housing 11, which is beneficial to improve the sealing effect of the cell. It may be understood that the encapsulation film 13 is further injected with the electrolyte solution. Therefore, in the above manner, contact between the electrolyte solution and the metal housing 11, corrosion of the metal housing 11, and decomposition of the electrolyte solution may further be avoided.

In the embodiment of the present disclosure, an air pressure between the metal housing 11 and the encapsulation film 13 is lower than an air pressure outside the metal housing 11.

In the present disclosure, the "air pressure" is short for an atmospheric pressure. The air pressure is the atmospheric pressure acting on a unit area, which is a weight of a vertical air column extending upward to an upper bound of the atmosphere on the unit area.

The air pressure between the metal housing 11 and the encapsulation film 13 is the air pressure in a space between the metal housing 11 and the encapsulation film 13, and is lower than the air pressure outside the metal housing 11. Therefore, in the embodiment of the present disclosure, a negative pressure exists between the metal housing 11 and the encapsulation film 13. In this way, the metal housing 11 is recessed or deformed under the action of atmospheric pressure, a gap between the metal housing 11 and the electrode core assembly 12 is reduced accordingly, and the space for movement or displacement of the electrode core assemblies 12 relative to each other is reduced. Therefore, the movement of the electrode core assembly 12 and displacement of the electrode core assemblies 12 relative to each other can be reduced, and the stability of the cell 100, the strength of the cell 100, and the safety performance of the cell 100 can be improved.

For example, the space between the metal housing 11 and the encapsulation film 13 may be vacuumized, so that a negative pressure exists between the metal housing 11 and the encapsulation film 13. In this way, the metal housing 11 and the inner electrode core assembly may be as close as possible, so as to reduce the inner gap and prevent the electrode core assembly from moving in the metal housing. In addition, displacement of the electrode core assemblies relative to each other can be avoided, and damage to the current collector, wrinkling of the separator, and falling of the active material can be reduced, thereby enhancing the mechanical strength of the entire cell, extending the service life of the cell, and improving safety performance of the cell.

In an implementation, the air pressure between the metal housing 11 and the encapsulation film 13 is P1. A value of P1 may range from −100 Kpa to −5 Kpa. Further, a value of P1 may range from −75 Kpa to −20 Kpa. Certainly, those skilled in the art may set the value of P1 according to an actual need.

The air pressure inside the encapsulation film 13 is P2. P1 and P2 satisfy P1>P2, and a ratio between P1 and P2 ranges from 0.05 to 0.85.

A value of P2 may range from −100 Kpa to −20 Kpa.

The air pressure inside the encapsulation film 13 is lower than the air pressure between the metal housing 11 and the encapsulation film 13.

P1, P2, and the ratio between P1 and P2 are set within the above range. The electrode core assembly 12 in the art adopts a double sealing mode. The electrode core assembly 12 is first sealed in the encapsulation film 13. In order to avoid damage to the encapsulation film 13 due to a bulge of the encapsulation film 13 caused by an excessively large internal air pressure, the air pressure between the metal housing 11 and the encapsulation film 13 is set to be greater than the air pressure inside the encapsulation film 13. In addition, it has been verified through a large number of experiments that when the ratio between P1 and P2 is in the above range, reliability of the double sealing of the cell is desirably ensured. In addition, the gap between the electrode plates is reduced, so that lithium ions can be better conducted.

In an embodiment of the present disclosure, there is one encapsulation film 13. In other words, one encapsulation film 13 is arranged, and multiple electrode core assemblies 12 connected in series are sealed in the one encapsulation film 13. Each electrode core assembly 12 includes an electrode core assembly body 123 and a first electrode 121 and a second electrode 122 configured to lead out a current. For two electrode core assemblies 12 connected in series, a position where the first electrode 121 of one electrode core assembly 12 and the second electrode 122 of the other electrode core assembly 12 are connected is located in the encapsulation film 13. That is to say, the encapsulation film 13 is integrally arranged, and the multiple electrode core assemblies 12 are sealed in the one encapsulation film 13.

Figure 3:
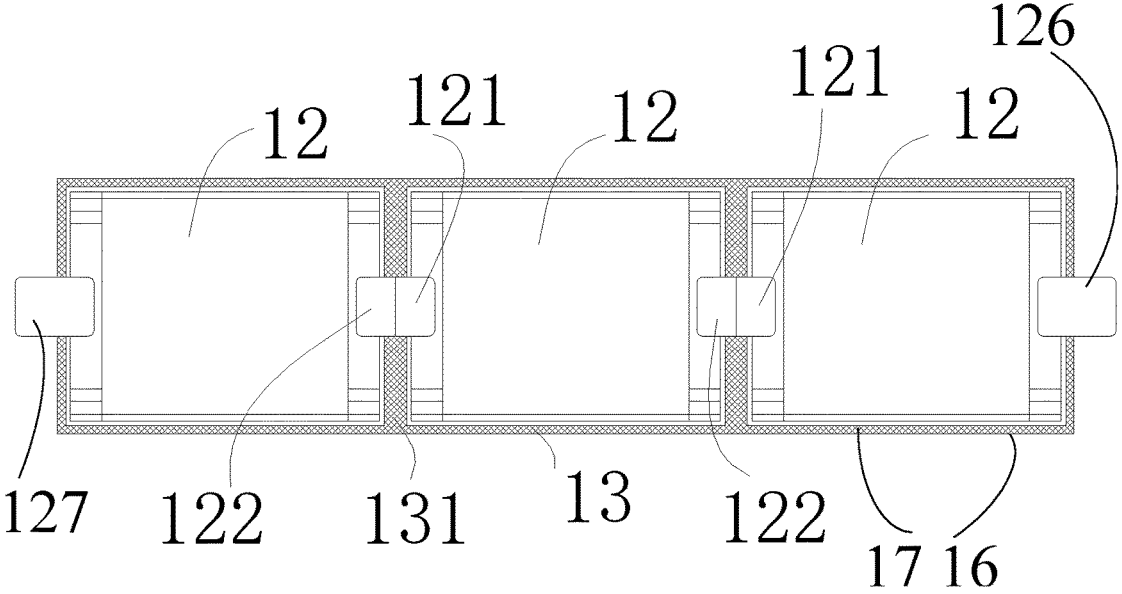
FIG. 3 is a schematic diagram of an electrode core assembly sealed in an encapsulation film according to an embodiment of the present disclosure.

In actual application, for example, as shown in FIG. 3, the multiple electrode core assemblies 12 may be connected in series, and then a whole encapsulation film 13 is used to wrap the electrode core assemblies 12 connected in series. For example, the electrode core assemblies 12 connected in series may be placed on a region of the encapsulation film 13 (or a groove may be provided on a part of the encapsulation film 13 in advance, and then the multiple electrode core assemblies 12 connected in series are placed in the groove), then another region of the encapsulation film 13 is folded toward the electrode core assemblies 12, and then the encapsulation film 13 in the two regions is heat-melted and sealed by hot melting. In this way, the electrode core assemblies 12 connected in series are sealed in the one encapsulation film 13.

An encapsulation portion 131 is formed at a position on the encapsulation film 13 corresponding to the first electrode 121 and/or the second electrode 122, to isolate two adjacent electrode core assembly bodies 123. For two adjacent electrode core assemblies 12, at least one of the first electrode 121 of one electrode core assembly 12 and the second electrode 122 of the other electrode core assembly 12 is arranged in the encapsulation portion 131. The multiple electrode core assembly bodies are isolated by the encapsulation portion 131, so as to prevent the electrolyte solution among the multiple electrode core assemblies from circulating. In this way, the multiple electrode core assemblies 12 do not affect each other, and the electrolyte solution in the multiple electrode core assemblies 12 is not decomposed due to an excessively large potential difference, thereby ensuring the safety and the service life of the cell.

The encapsulation portion 131 may have multiple implementations. For example, the encapsulation film 13 may be fastened with cable ties to form the encapsulation portion 131, or the encapsulation film 13 may be directly hot melted and connected to form the encapsulation portion 131. The specific implementation of the encapsulation portion 131 is not particularly limited.

Figure 4:
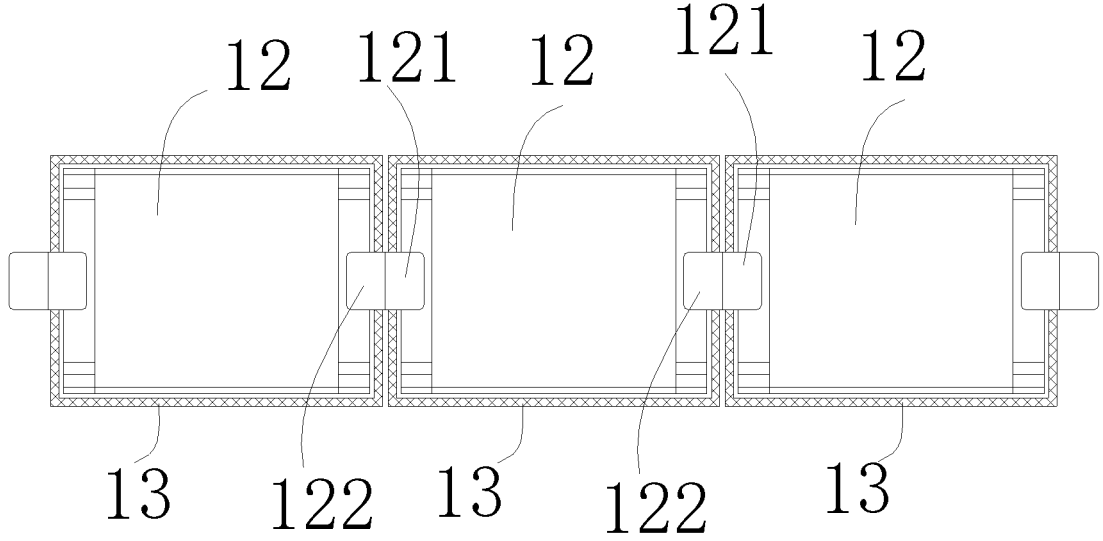
FIG. 4 is another schematic diagram of an electrode core assembly sealed in an encapsulation film according to an embodiment of the present disclosure.

In another embodiment of the present disclosure, as shown in FIG. 4, there are multiple encapsulation films 13, that is to say, multiple encapsulation films 13 are arranged. At least one electrode core assembly 12 is sealed in an encapsulation film 13, and the electrode core assemblies are connected in series.

In other words, the number of encapsulation films 13 and the number of electrode core assemblies 12 are in a one-to-one correspondence. Each electrode core assembly 12 is individually sealed in one encapsulation film 13. In the implementation, after multiple electrode core assemblies 12 are manufactured, one encapsulation film 13 may be covered outside each electrode core assembly 12, and then the electrode core assemblies are connected in series.

At least one of the first electrode 121 and the second electrode 122 of the electrode core assembly 12 extends out of the encapsulation film 13. For example, the first electrode 121 may extend out of the encapsulation film 13, or the second electrode 122 may extend out of the encapsulation film 13, or both the first electrode 121 and the second electrode 122 extend out of the encapsulation film 13. At least one of the first electrode 121 and/or the second electrode 122 extends out of the encapsulation film 13, and the extended electrode may be used to connect other electrode core assemblies in series.

Further, the metal housing 11 includes a housing body 111 with an opening and an end cover 112. The end cover 112 is hermetically connected with the opening of the housing body 111. The multiple electrode core assemblies 12 are connected in series to form an electrode core string. Two ends of the electrode core string respectively include a first electrode 126 and a second electrode 127. The first electrode of the electrode core string is also the first electrode 121 of the electrode core assembly 12 arranged on one end of the electrode core string, and the second electrode of the electrode core string is also the second electrode 122 of the electrode core assembly 12 arranged on another end of the electrode core string. The first electrode and the second electrode of the electrode core string are respectively led out through the end cover 112.

In some implementations, the housing body 111 may be provided with an opening at both ends, and two end covers 112 may be arranged, so that the two end covers 112 are respectively hermetically connected with the opening at both ends of the housing body 111. In this manner, the first electrode and the second electrode of the electrode core string may be led out through the same end cover 112, or may be respectively led out through two end covers 112, which is not limited.

In some implementations, the housing body 111 may be provided with an opening only on one end, and one end cover 112 is arranged, so that the end cover 112 is hermetically connected with the opening on one end of the housing body 111. In this manner, the first electrode and the second electrode of the electrode core string are led out through the same end cover 112.

In the embodiment of the present disclosure, the thickness of the cell extends along a second direction B perpendicular to the first direction A. The metal housing 11 has two opposite first surfaces 113 along the second direction B, and the first surface 113 is a largest surface of the cell 100. At least one of the first surfaces 113 is recessed into the metal housing 11, so that the metal housing 11 and the electrode core assembly 12 may be attached as close as possible.

Since the thickness of the metal housing 11 is relatively small and is a relatively thin sheet, a recess 114 on the first surface 113 of the metal housing 11 may be, for example, formed when the inside of the metal housing 11 is vacuumized. That is to say, when the space between the metal housing 11 and the encapsulation film 13 is vacuumized such that the air pressure between the metal housing 11 and the encapsulation film 13 is lower than the air pressure outside the metal housing 11, as the vacuumizing proceeds, the first surface 113 of the metal housing 11 is easily recessed into the metal housing 11 to form the recess 114.

During normal use of the cell, due to reasons such as expansion of the material itself, gas production by the electrolyte solution, and the like, the cell can be generally expanded, and a region with the greatest expansion and deformation is often on the largest surface of the cell. By using the technology, the largest surface of the cell in an initial state is set to be slightly recessed by vacuumizing, which can effectively alleviate squeezing between the cells after being expanded, thereby increasing the life and improving the safety performance of the cells and the entire system.

Figure 5:
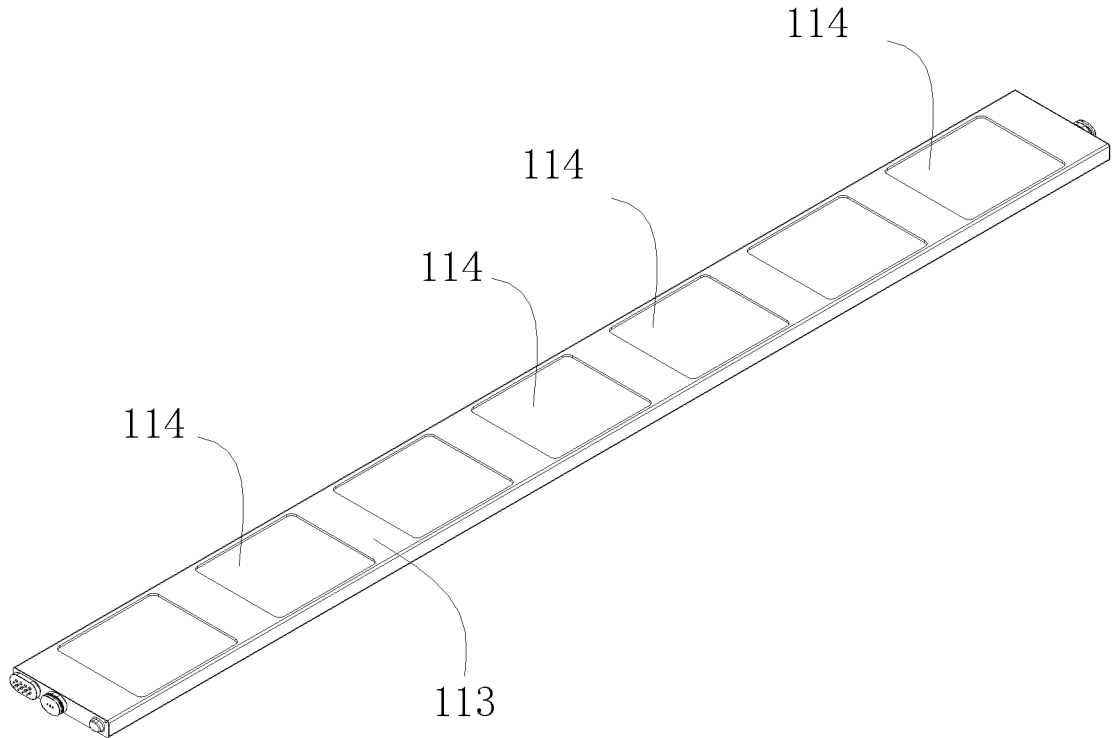
FIG. 5 is a schematic diagram of a first surface of a metal housing having a recess formed according to an embodiment of the present disclosure.

In some other embodiments, as shown in FIG. 5, the inside of the metal housing 11 may be vacuumized after the recess 114 is formed on the first surface 113 of the metal housing 11 in advance. There may be multiple recesses 114 on the first surface 113 of the metal housing 11. For example, multiple recesses 114 are formed on the first surface 113 in advance, and a position of each recess 114 corresponds to a position at which one electrode core assembly is located.

In some implementations, two opposite first surfaces 113 of the metal housing 11 are both recessed inward, so that a recessed region can hold the electrode core assemblies 12.

An exhaust hole may be provided on the metal housing 11, and the space between the metal housing 11 and the encapsulation film 13 is vacuumized through the exhaust hole. The exhaust hole is required to be sealed, and therefore a sealing member is further arranged in the exhaust hole to cover the exhaust hole. The sealing member may be, for example, a plug, a rubber member, and the like, which is not limited thereto.

In some implementations, before the metal housing 11 is vacuumized, a gap is provided between the electrode core assembly 12 and an inner surface of the metal housing 11. The gap facilitates mounting of the electrode core assembly 12 into the metal housing 11. After the metal housing 11 is vacuumized, the metal housing 11 is pressed against an outer surface of the electrode core assembly 12 along the second direction B to hold the electrode core assembly 12. Therefore, the space for the electrode core assembly to move inside the metal housing is reduced, and the safety performance of the cell is improved.

In the embodiment of the present disclosure, the metal housing 11 has a high strength and an effective heat dissipation effect. The metal housing 11 may include but is not limited to an aluminum housing or a steel housing.

In some embodiments, the thickness of the metal housing 11 ranges from 0.05 mm to 1 mm.

A relatively large thickness of the metal housing 11 increases the weight of the cell 100 and reduces the capacity of the cell 100. In addition, due to the excessively large thickness of the metal housing 11, the metal housing 11 cannot be easily recessed or deformed toward the electrode core assembly 12 under the action of the atmospheric pressure. As a result, the distance between the metal housing 11 and the electrode core assembly 12 cannot be reduced, and the electrode core assembly 12 cannot be effectively positioned. Moreover, the excessively large thickness of the metal housing 11 increases costs for vacuumizing, and increases manufacturing costs.

In the present disclosure, the thickness of the metal housing 11 is defined within the above range, which not only can ensure the strength of the metal housing 11 but also may not reduce the capacity of the cell 100. Moreover, the metal housing 11 can be deformed more easily in the negative pressure state, so that the distance between the metal housing 11 and the electrode core assembly 12 can be reduced, thereby reducing movement of the electrode core assembly 12 inside the metal housing 11 and displacement of the electrode core assemblies 12 relative to each other.

In the embodiment of the present disclosure, the encapsulation film 13 includes a non-metallic outer film layer 16 and a non-metallic inner film layer 17 that are stacked, and the inner film layer 17 is arranged between the outer film layer 16 and the electrode core assembly 12.

The inner film layer has desirable chemical stability, for example, a material with corrosion resistance of the electrolyte solution may be used. For example, the material may be polypropylene (PP), polyethylene (PE), or polyethylene terephthalate (PET), or may be a combination of more than one of the above materials.

The outer film layer is a protective layer, and the outer film layer may be used to prevent penetration of air, especially water vapor, oxygen, and the like. The material of the outer film layer may be, for example, PET, polyamide (PA), or PP, or may be a combination of more than one of the above materials.

In the encapsulation film 13 of this embodiment, a melting point of the outer film layer is greater than a melting point of the inner film layer, so that the outer film layer is not melted during sealing by hot melting, and the inner film layer can be melted in time to ensure excellent sealing property. Further, a difference between the melting point of the outer film layer and the melting point of the inner film layer may be between 30° C. to 80° C. For example, the difference between the two melting points may be 50° C., 70° C., or the like. A specific material may be determined according to an actual need.

The non-metallic outer film layer and the non-metallic inner film layer are bonded and combined by using an adhesive. For example, a material of the outer film layer may be PP, a material of the inner film layer may be PET, and a binder for bonding the outer film layer and the inner film layer may be, for example, a polyolefin binder, so as to form a complex film by bonding.

In this embodiment, the electrode core assembly is sealed by using a double-layer non-metallic film to form an encapsulation film. Since the non-metallic encapsulation film has a higher tensile strength and elongation at break, limitation on the thickness of the cell may be reduced, so that the produced cell has a larger thickness. The thickness of the cell in this embodiment may be increased and has a wide range, for example, may be larger than 10 mm, or, may range from 13 mm to 75 mm.

In some other implementations of the present disclosure, the encapsulation film may be an aluminum-plastic film.

In an embodiment of the present disclosure, the cell is a lithium-ion cell.

Another aspect of the present disclosure provides a battery module, including the cell of any of the above embodiments. By using the battery module provided in the present disclosure, the sealing property is improved, a number of assembly processes is decreased, and cell costs are reduced.

Figure 6:
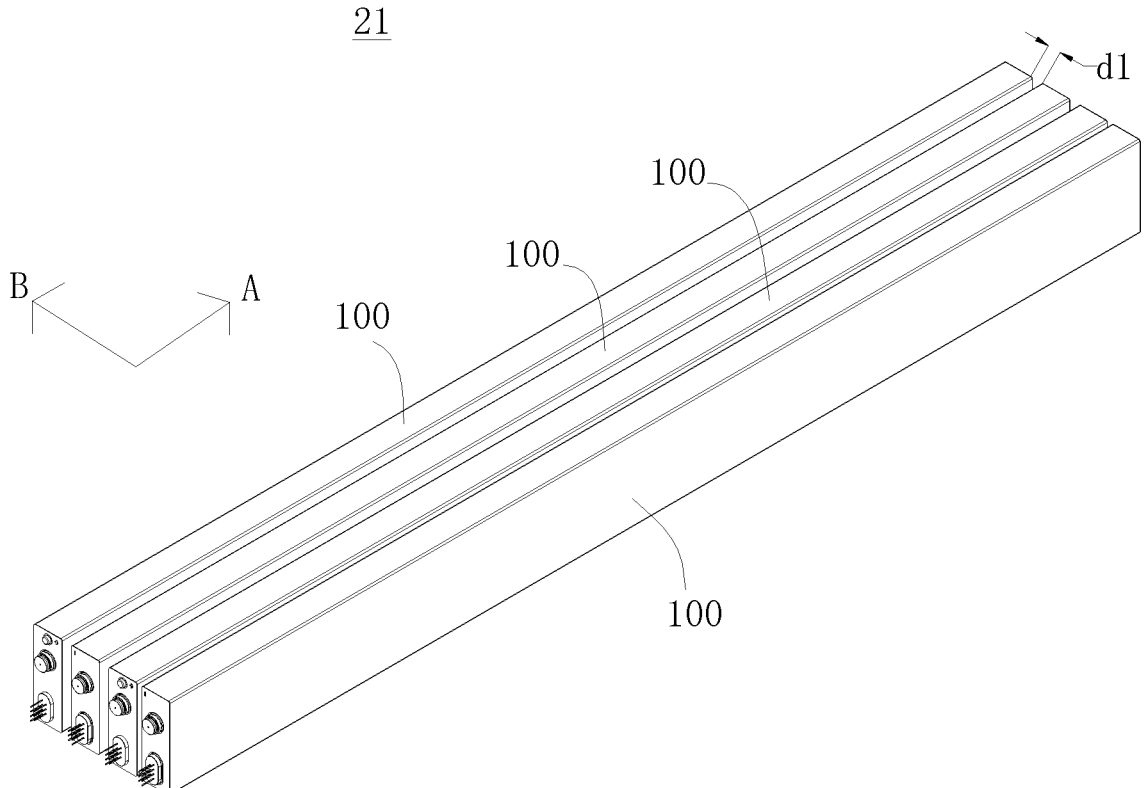
FIG. 6 is a schematic structural diagram of a cell array according to an embodiment of the present disclosure.
Figure 7:
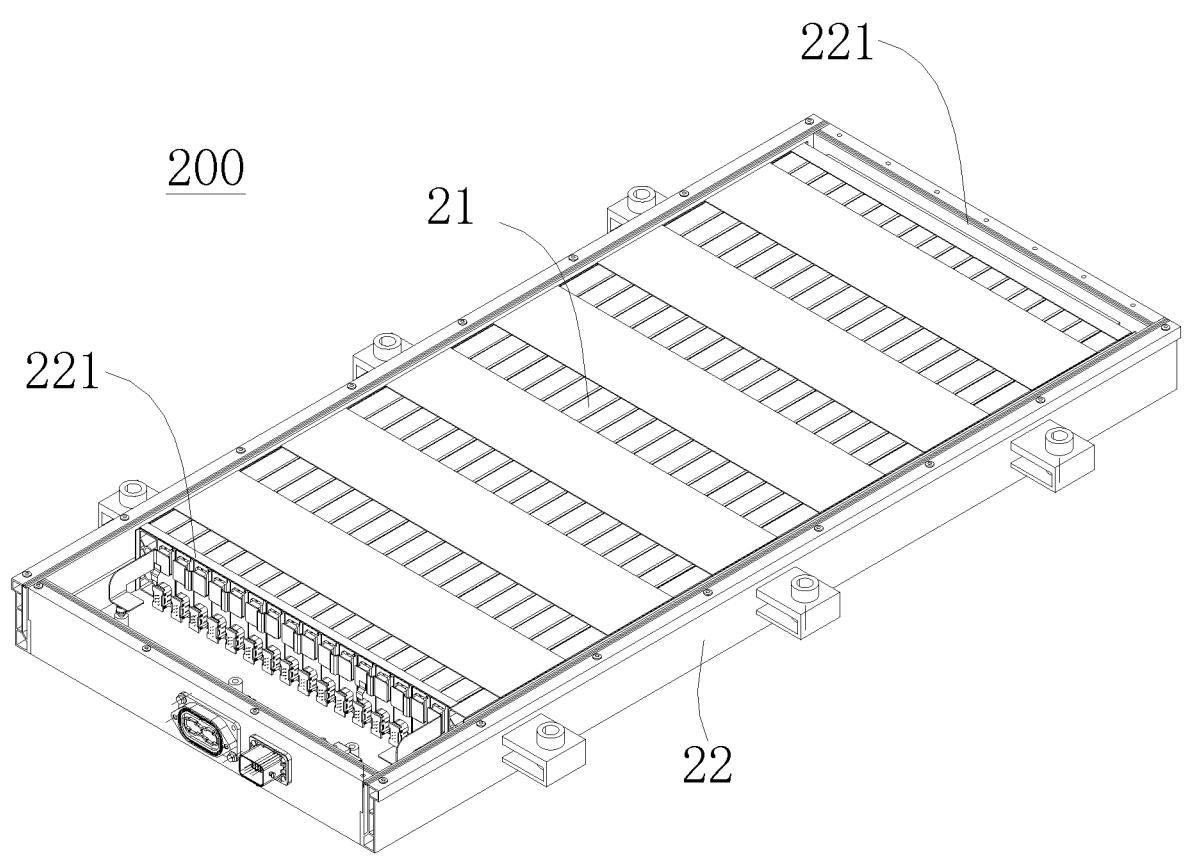
FIG. 7 is a schematic structural diagram of a battery pack according to an embodiment of the present disclosure.

Referring to FIG. 6 and FIG. 7, the present disclosure further provides a battery pack 200, including a cell array 21. The cell array 21 includes multiple cells 100. Each cell 100 is the cell 100 described in any of the above embodiments. Therefore, the specific structure of the cell 100 is not described herein one by one.

One or more cell arrays 21 may be arranged, and one or more cells 100 may be arranged in each cell array 21. In actual production, the number of cells 100 and the number of cell arrays 21 may be set according to actual requirements. This is not specifically limited in the present disclosure.

In the embodiment of the present disclosure, a length direction of the cell 100 extends along a first direction A, and a thickness direction of the cell extends along a second direction B perpendicular to the first direction A. The multiple cells 100 are arranged in sequence along the second direction B to form the cell array 21. A gap is provided between at least two adjacent cells 100. A ratio of the gap to a thickness of the cell 100 ranges from 0.001 to 0.15.

It should be noted that the gap between two adjacent cells varies with an increase of an operating time of the cells. During the operation, after the operation, or before the cells leave the factory, as long as the ratio of the gap between the cells to the thickness falls within the scope defined in the present disclosure, the gap falls within the protection scope of the present disclosure.

In the present disclosure, a certain gap reserved between the cells 100 may reserve a buffer space for the expansion of the cells 100.

The expansion of the cells 100 is related to the thicknesses of the cells 100. A cell 100 with a larger thickness is more likely to expand. In the present disclosure, the ratio of the gap between the cells 100 to the thickness of the cell 100 is set to 0.001-0.15. In this way, a space of the battery pack 200 can be fully used, thereby improving utilization of the battery pack 200 and providing more effective cushion for the expansion of the cells 100.

In addition, heat is generated when the cell 100 expands. Therefore, the gap reserved between the cells 100 can be used as a heat dissipation channel, such as an air channel, so that a surface of the cell 100 with a larger area has a better heat dissipation effect. In this way, heat dissipation efficiency of the battery pack 200 can be further improved, and the safety performance of the battery pack 200 can be provided.

In the above solution, the gap between the cells 100 may mean that a certain space is simply reserved between the cells 100 and no structural member is arranged between the cells, or may mean that an additional structural member is arranged between the cells 100 to separate the cells 100 from each other.

It should be noted that, when a structural member is arranged between the cells 100, the gap between the cells 100 should be understood as a distance between the cells 100 on two sides of the structural member rather than a distance between the structural member and each cell 100.

It should be noted that, a certain gap may be reserved between the structural member and each of the cells 100 on the two sides of the structural member, or the structural member may be in direct contact with the cells. When the structural member is in direct contact with the cells 100 arranged on the two sides, the structural member is required to have a certain flexibility, so as to provide cushion for the expansion of the cells 100. The structural member includes but is not limited to an aerogel, a thermally conductive structural adhesive, or a thermal insulation foam.

In the present disclosure, when multiple cell arrays 21 are arranged, the gap is defined as a distance between two adjacent cells 100 in a same cell array 21 rather than a distance between two adjacent cells in different cell arrays 21. In addition, in the same cell array 21, a certain gap may be reserved between all of the adjacent cells, or a certain gap may be reserved between some of the adjacent cells.

In some implementations, the gap between two adjacent cells 100 includes a first gap d1. The first gap d1 is defined as a minimum distance between two end covers 112 of the two adjacent cells along the second direction B, and the thickness of the cell 100 is a dimension of the end cover 112 along the second direction B. A ratio of the first gap d1 to the thickness of the cell 100 ranges from 0.005 to 0.1.

In the above implementation, since the end cover 112 has a relatively high strength, the end cover is less likely to expand than a housing body 111. After the cell 100 operates for a period of time, a chemical reaction occurs inside the cell, and the cell 100 expands and squeezes adjacent cells 100. Therefore, the first gap d1 changes (for example, the first gap gradually increases). However, the change is relatively small and can be ignored. In an embodiment, even if the first gap changes, the ratio of the first gap to the thickness of the cell 100 still satisfies the above range. In the above implementation, two ends of the housing body 111 are provided with the end covers 112. When the cells 100 are arranged into the cell array 21 along the thickness direction, the gap between the two cells 100 is defined as a minimum distance between two end covers 112 arranged on a same end of the cell array 21 rather than a distance between two end covers 112 arranged on different ends of the cells 100.

In some implementations, the gap between the two adjacent cells 100 includes a second gap d2. The second gap d2 is defined as a minimum distance between two first surfaces 113 of the two adjacent cells 100 facing each other. The second gap d2 of the cell 100 before use is larger than the second gap d2 after use.

The expression "before use" may be understood as a time point before the cells 100 are delivered from the factory after assembly, or before the cells start supplying electric energy to the outside after the cells are delivered from the factory. The expression "after use" may be understood as a time point after the cells 100 start supplying electric energy to the outside. For example, the battery pack 200 is assembled on an electric vehicle 1000. In this case, the state before use may be understood as a state of the new vehicle, and the state after use may be understood as a state of the vehicle after traveling for a mileage.

In this implementation, the second gap is defined as a minimum distance between two opposite first surfaces of two adjacent cells 100, and the distance gradually decreases with an increase of a service time of the cells. A main reason is that after the cells expand, the distance between two adjacent largest surfaces gradually decreases.

In the embodiment of the present disclosure, the battery pack 200 further includes a cell cover and a tray 22. The cell cover is not shown in a view of FIG. 7. The cell cover and the tray 22 are hermetically connected to form a cell accommodating cavity, and the cell array 21 is arranged in the cell accommodating cavity. The tray 22 includes a support member 221, and a support region is formed on the metal housing 11 of the cells 100. The cells 100 are butted with the support member 221 through the support region of the cells and are supported on the support member 221.

Further, the tray 22 includes a side beam. The side beam is configured as the support member 221, and two ends of the cells 100 along the first direction A are supported on the side beam.

In the cell 100 of the embodiments of the present disclosure, an air pressure between the metal housing 11 and the encapsulation film 13 is a negative pressure, which can improve an overall strength of the cell. Therefore, the cell 100 may be directly mounted to the tray 22 by using the strength of the cell as a support. In this way, the structure such as a transverse beam or a longitudinal beam is not required to be arranged on the tray 22 to support the cell 100, and the utilization of the internal space of the battery pack is increased.

Figure 8:
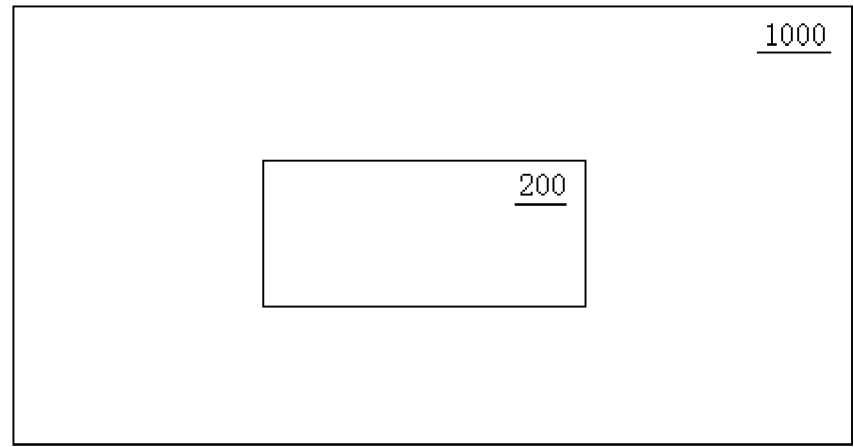
FIG. 8 is a schematic structural diagram of an electric vehicle according to an embodiment of the present disclosure.

As shown in FIG. 8, an electric vehicle 1000 includes the above battery pack 200. By using the electric vehicle 1000 provided in the present disclosure, a high mile range and low costs are realized.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In description of this specification, description of reference terms such as "an embodiment", "specific embodiments", or "an example", means including specific features, structures, materials, or features described in the embodiment or example in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A cell, comprising a metal housing, and a plurality of accommodating cavities, a plurality of electrode core assemblies, and an encapsulation film arranged between the metal housing and the electrode core assemblies, wherein the electrode core assemblies are arranged along a first direction and connected in series; a length of each of the electrode core assemblies extends along the first direction; each of the electrode core assemblies comprises an electrode core assembly body, and a first electrode and a second electrode configured to lead out a current; the first electrode and the second electrode are respectively arranged on two sides of the electrode core assembly body along the first direction;

at least one of the accommodating cavities is defined by the encapsulation film; the electrode core assembly body is arranged in the at least one of the accommodating cavities and sealed in the encapsulation film; the encapsulation film is integrally formed to encapsulate the electrode core assemblies; and an encapsulation portion of the encapsulation film is disposed between two adjacent electrode core assemblies;

a length of the cell extends along the first direction; a thickness of the cell extends along a second direction perpendicular to the first direction; and a ratio of the length to the thickness of the cell ranges from 5 to 250, wherein an air pressure between the metal housing and the encapsulation film is lower than an air pressure outside the metal housing, and an air pressure inside the encapsulation film is lower than the air pressure between the metal housing and the encapsulation film.

2. The cell according to claim 1, wherein for the two adjacent electrode core assemblies, a first electrode of a first electrode core assembly of the two adjacent electrode core assemblies is electrically connected with a second electrode of a second electrode core assembly of the two adjacent electrode core assemblies to realize series connection.

3. The cell according to claim 2, wherein the first electrode of the first electrode core assembly and the second electrode of the second electrode core assembly are connected at a position corresponding to the encapsulation portion of the encapsulation film.

4. The cell according to claim 3, wherein the encapsulation portion is formed at a position on the encapsulation film corresponding to the first electrode and/or the second electrode and to separate the plurality of accommodating cavities; and at least one of the first electrode of the first electrode core assembly or the second electrode of the second electrode core assembly is arranged at the encapsulation portion.

5. The cell according to claim 1, wherein the air pressure between the metal housing and the encapsulation film is P1; and P1 ranges from −100 Kpa to −5 Kpa.

6. The cell according to claim 5, wherein the air pressure P1 ranges from −75 Kpa to −20 Kpa.

7. The cell according to claim 6, wherein the air pressure inside the encapsulation film is P2; and a ratio of P2/P1 ranges from 0.05 to 0.85.

8. The cell according to claim 7, wherein the air pressure P2 ranges from −100 Kpa to −20 Kpa.

9. The cell according to claim 1, wherein the metal housing has two opposite first surfaces along the second direction; and at least one of the two opposite first surfaces is recessed into the metal housing.

10. The cell according to claim 9, wherein the two opposite first surfaces are both recessed into the metal housing to hold the electrode core assemblies.

11. The cell according to claim 9, wherein the metal housing comprises a plurality of recesses, and wherein one of the recesses is arranged corresponding to one of the electrode core assemblies.

12. The cell according to claim 1, wherein the encapsulation film comprises an outer film layer and an inner film layer that are stacked; the inner film layer is arranged between the electrode core assemblies and the outer film layer; and a melting point of the outer film layer is greater than a melting point of the inner film layer.

13. The cell according to claim 12, wherein a difference between the melting point of the outer film layer and the melting point of the inner film layer ranges from 30° C. to 80° C.

14. The cell according to claim 12, wherein the outer film layer comprises one or more of polyethylene terephthalate, polyamide, and polypropylene; and the inner film layer comprises one or more of polypropylene, polyethylene, and polyethylene terephthalate.

15. The cell according to claim 12, wherein the outer film layer and the inner film layer are bonded with each other.

16. The cell according to claim 15, further comprising a binder that bonds the outer film layer and the inner film layer, wherein the binder is a polyolefin binder.

17. The cell according to claim 1, wherein the encapsulation film is an aluminum-plastic film.

18. The cell according to claim 1, wherein the metal housing comprises a housing body with an opening and an end cover; the end cover is hermetically connected with the opening of the housing body; the electrode core assemblies are connected in series to form an electrode core string; two ends of the electrode core string respectively comprise a third electrode and a fourth electrode; and one of the third electrode and the fourth electrode is led out through the end cover.

19. The cell according to claim 18, wherein an exhaust hole is provided on the metal housing; and a sealing member is arranged in the exhaust hole.

20. The cell according to claim 1, wherein a thickness of the metal housing ranges from 0.05 mm to 1 mm.

21. A battery pack, comprising a cell array comprising a plurality of cells, wherein each of the cells comprises a metal housing, and a plurality of accommodating cavities, a plurality of electrode core assemblies, and an encapsulation film arranged between the metal housing and the electrode core assemblies;

the electrode core assemblies are arranged along a first direction and connected in series; a length of each of the electrode core assemblies extends along the first direction; each of the electrode core assemblies comprises an electrode core assembly body, and a first electrode and a second electrode configured to lead out a current; the first electrode and the second electrode are respectively arranged on two sides of the electrode core assembly body along the first direction;

at least one of the accommodating cavities is defined by the encapsulation film; the electrode core assembly body is arranged in the at least one of the accommodating cavities and sealed in the encapsulation film; the encapsulation film is integrally formed to encapsulate the electrode core assemblies; and an encapsulation portion of the encapsulation film is disposed between two adjacent electrode core assemblies;

a length of each of the cells extends along the first direction; a thickness of each of the cells extends along a second direction perpendicular to the first direction; and a ratio of the length to the thickness of each of the cells ranges from 5 to 250, wherein an air pressure between the metal housing and the encapsulation film is lower than an air pressure outside the metal housing, and an air pressure inside the encapsulation film is lower than the air pressure between the metal housing and the encapsulation film.

22. The battery pack according to claim 21, wherein the cells are arranged in sequence along the second direction to form the cell array;

a gap is provided between two adjacent cells of the cells; and a ratio of the gap to a thickness of a cell of the two adjacent cells ranges from 0.001 to 0.15.

23. The battery pack according to claim 22, wherein the metal housing comprises a housing body with an opening and an end cover; the end cover is hermetically connected with the opening of the housing body;

the gap between the two adjacent cells comprises a first gap d1; the first gap is a minimum distance between two end covers of the two adjacent cells along the second direction; the thickness of the cell of the two adjacent cells is equal to a dimension of one of the two end covers along the second direction; and a ratio of the first gap d1 to the thickness of the cell of the two adjacent cells ranges from 0.005 to 0.1.

24. The battery pack according to claim 23, wherein the metal housing has two opposite first surfaces along the second direction; the gap between the two adjacent cells comprises a second gap d2; and the second gap is a minimum distance between the two first surfaces of the two adjacent cells facing each other.

25. The battery pack according to claim 24, wherein the second gap d2 before use of the battery pack is larger than the second gap d2 after use of the battery pack.

26. The battery pack according to claim 22, further comprising a battery pack cover and a tray, wherein the battery pack cover is hermetically connected with the tray to form a cell accommodating cavity; the cell array is arranged in the cell accommodating cavity; the tray comprises a support member to form a support region on the metal housing; and the cells are supported on the support member.

27. The battery pack according to claim 26, wherein the tray comprises a side beam as the support member; and two ends of each of the cells along the first direction are supported on the side beam.

28. An electric vehicle, comprising the battery pack according to claim 21.

* * * * *